Inventor
Saburo Uemura by Hill, Sherman, Meroni, Gross & Simpson Attys.

Nov. 27, 1962

SABURO UEMURA

BOUNDARY-DISPLACEMENT MAGNETIC RECORDING AND REPRODUCING SYSTEM 3,066,197

Filed Sept. 25, 1959

2 Sheets-Sheet 2

Inventor
Saburo Uemura by Hill, Sherman, Meroni, Gross & Simpson Attys.

3,066,197
BOUNDARY-DISPLACEMENT MAGNETIC RECORDING AND REPRODUCING SYSTEM

Saburo Uemura, Tokyo, Japan, assignor of three-fourths to Sony Corporation (Sony Kabushikikaisha), Tokyo, Japan, a corporation of Japan
Filed Sept. 25, 1959, Ser. No. 842,359
Claims priority, application Japan June 5, 1959
15 Claims. (Cl. 179—100.2)

This invention relates to a boundary-displacement magnetic recording and reproducing system and includes the apparatus, method and record or article aspects thereof. More particularly, this invention relates to such a boundary-displacement magnetic recording and reproducing system in which either one side of the boundary region can be displayed or made visible when magnetic powder is put thereon.

A so-called method of boundary-displacement magnetic recording has been proposed by H. L. Daniels on "Electronics," April 1952.

This known magnetic recording, however, has a disadvantage in that the reproduction can not be faithfully performed by an ordinary magnetic recording head owing to the fact that the reproduced signal is lacking in direct current and lower frequency components.

One object of this invention is to provide a boundary-displacement magnetic recording system in which reproduction is faithfully obtained by a conventional magnetic reproducing head.

Another object of this invention is to provide a boundary-displacement magnetic recording and reproducing system in which magnetic powder can be put onto the magnetic tape on either all or part of the the area on either one side of a wave form or boundary region to thus display the wave form.

A further object of this invention is to provide a simple and easily carried out boundary-displacement magnetic recording and reproducing system in which magnetic powder can be put substantially homogeneously onto the magnetic tape on all the area on either one side of the bounary region so that the wave form is accurately visible.

A still further object of this invention is to provide a magnetic tape in which one side of the boundary region can catch or hold magnetic powder to display a recorded wave form of the variable area type with a clear contrast against the other side of the boundary region which does not catch or hold magnetic powder so that the thus displayed wave form can be utilized to produce the same general type of sound reproducing effect as an optically recorded film.

Figure 1:
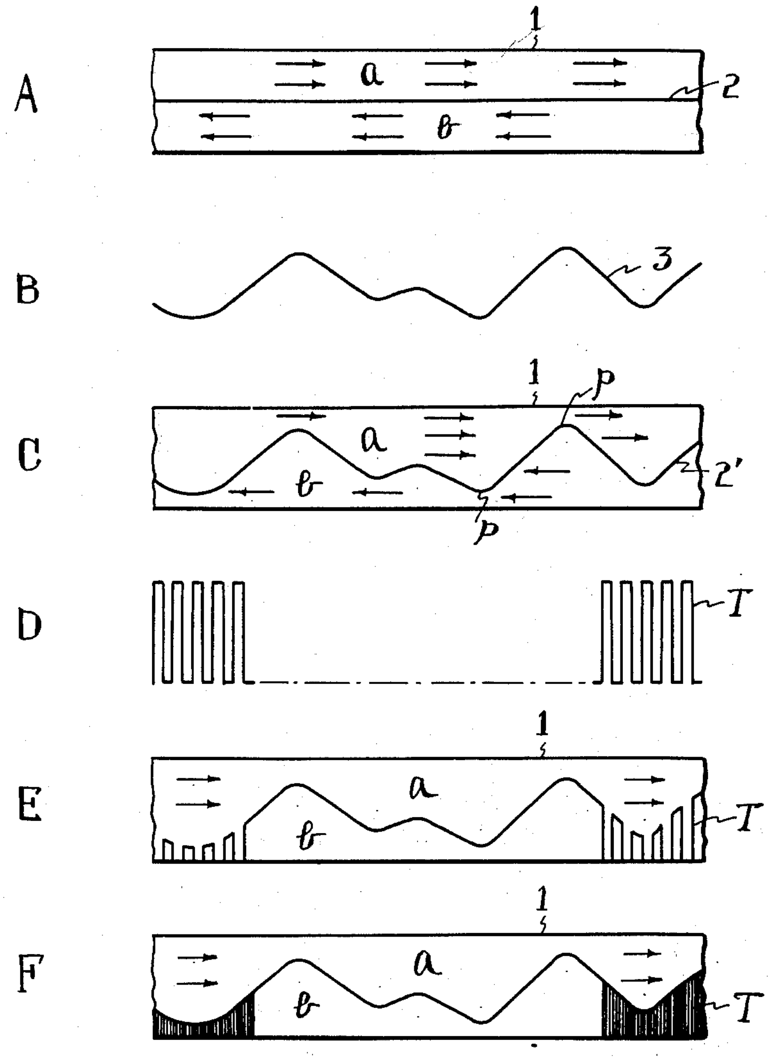
Figure 2:
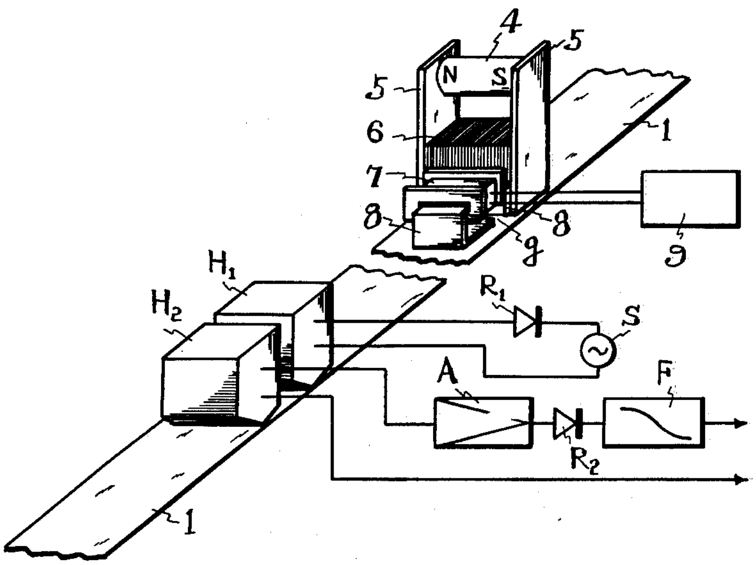
Figure 3:
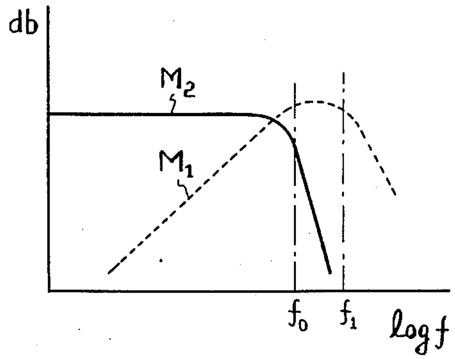

Other objects, features and advantages of this invention will become apparent to those skilled in this art from the following detailed discription taken in connection with the accompanying drawing in which, FIG. 1, A–F show diagrammatic representations illustrating the operation of the boundary-displacement magnetic recording and reproducing according to this invention, FIG. 2 is a perspective view of an arrangement of the boundary-displacement magnetic recording and reproducing apparatus according to this invention, and FIG. 3 shows curves illustrating the frequency characteristics of the reproduced output for the apparatus shown in FIG. 2.

Prior to entering into a description of our invention, we will first refer to the general principle of the well-known boundary-displacement magnetic recording and reproducing.

In FIG. 1, 1 is a magnetic medium or magnetic tape. Now, when a boundary-displacement magnetic recording is applied to this magnetic tape, the upper half or part *a* of the tape is positively saturated or magnetized to saturation in the direction as shown by the arrows and the lower half or part *b* of this tape is negatively saturated or magnetized to saturation in the opposite direction as shown by the oppositely directed arrows while the mid-line or the boundary region 2 between the two saturated parts is parallel to the longitudinal saturation directions of the tape in the case where no signal is recorded.

If, however, a signal 3 as shown in FIG. 1–B, is applied to this same tape by a suitable boundary-displacement magnetic recording apparatus, the boundary region 2 is transversely displaced in proportion to the amplitudes of the recording signal. This produces a record or wave form line or boundary region 2' as shown in FIG. 1–C with the upper part of the magnetic tape above this wave form line or record 2' being biased in the positive saturation direction and the lower part thereof being biased in the negative saturation direction. This is the so-called boundary-displacement magnetic recording.

FIG. 2 shows a perspective view of one example of a boundary-displacement magnetic recording head arrangement in which 4 is a permanent magnet, 5 represents its yoke and 6 is a lamination stack. 7 designates a head coil which is connected to a source 9 for signals to be recorded. 8 are cores which form an operative air gap *g*.

In using this boundary-displacement type magnetic recording head the air gap *g* and the permanent magnet 4 are disposed perpendicularly with respect to the advancing direction of the magnetic tape (or the longitudinal direction of the tape) and the center of the air gap is preferably on the midpoint of the width of the tape. Then the magnetic tape is biased by the direct current magnetic field of the permanent magnet 4 in such a manner that the boundary region 2 is formed on the center line of the tape, the upper region *a* being positively saturated and the lower region *b* being negatively saturated as shown in FIG. 1-A. In this condition, the coil 7 is energized by the current from the source 9 and varying in the form of the record 3 as shown in FIG. 1–B so that the boundary region 2' is transversely displaced according to the amplitude of the signal as shown in FIG. 1–C.

Now the description will be continued in connection with the reproduction of such a boundary-displacement magnetic recording. The change in the direction of the magnetic flux occurs at the boundary region 2' which defines the boundary between the positive saturation area *a* and the negative saturation area *b*. The signal thus recorded can be reproduced by using an ordinary magnetic head. That parts or portions *p* of this boundary 2' are less inclined to the horizontal or are generally parallel to the longitudinal saturation directions of the magnetic tape and the effective residual magnetism in these portions is weak so that the signal cannot be continuously reproduced.

Thus, the output is lacking in the lower frequency components and in a direct current component of the signal and will show a frequency response curve $M_1$, as shown by the dotted line in FIG. 3.

For improvement of the reproduction characteristics, it will be noted that a higher frequency pulse magnetic recording is superimposed on the boundary-displacement magnetic recording.

One example of a method for this purpose is that the boundary-displacement recording head is energized by a resultant current obtained by superimposing a biasing direct current on a signal current, the resultant current being interrupted at some higher period or frequency by a switching means before it is supplied to the boundary-displacement recording. However, this method has the disadvantages that a greater amount of power is needed because of the fact that the boundary-displacement recording head is energized by the high frequency current and also that the circuit for this method becomes complicated.

This invention is intended to avoid the disadvantages. That is, a carrier pulse current or bias pulse signal having a frequency which is adequately higher than that of the signal current is applied to an ordinary recording head. This ordinary head is arranged to act on the magnetic tape portions already recorded by a suitable boundary-displacement recording head with a desired recording current in order to superimpose the pulse recording onto the boundary-displacement recording. The frequency of the carrier pulse current or the bias pulse signal may preferably be selected to be the highest possible frequency permitted by the gap of the head (which limits this frequency) or at least to be a supersonic frequency. The amplitude of the bias pulse signal may preferably be so selected that the magnetic saturation of either one side of the bounary region 2' is reversed to the opposite polarity.

FIG. 2 shows an arrangement or apparatus embodying this invention in which $H_1$ is an ordinary recording head arranged to act on portions of the magnetic tape which have already been recorded by the boundary-displacement recording head H. The recording head $H_1$ is energized by a positively or negatively biased carrier pulse current.

In this example, the head $H_1$ is connected through a half wave rectifier $R_1$ to a source S which produces a current having an adequately higher frequency as compared with the frequency of the source 9 and which higher frequency is preferably a supersonic frequency. Accordingly the head $H_1$ is energized by the rectified pulse shaped carrier frequency current T as shown in FIG. 1–D. The rectified carrier frequency magnetic record is superimposed onto the boundary-displacement record 2'. If the region *a* is saturated in the positive direction, while the region *b* is saturated in the negative direction and if the rectified carrier frequency current consists of pulses capable of magnetizing the record to saturation in the positive direction under all conditions (that is, such pulses are not only capable of neutralizing the previous negative saturation of portions of the record but are also capable of additionally and positively saturating such portions of the record to thus be able to change portions previously saturated in the negative direction to be saturated in the positive direction), the positively saturated region *a* is not changed in its magnetization by the superimposition of these positive pulses, whereas the negatively saturated region *b* is changed in its magnetization by the superimposition of these positive pulses in such a manner that the signal 3 supplies an amplitude modulation of the positive direction pulse of the carrier T or acts as their boundary. That is, the parts or areas which are above the pulsed or square wave line now defining the region 2' are magnetized in the positive direction, while the parts or areas therebetween (and below the general line of the signal 3) are magnetized in the negative direction with the result that there are magnetic recording strips formed by positively and negatively directed residual (and saturated) magnetism which are alternatively disposed in the direction perpendicular to the advance direction of the magnetic tape and only on the underside of the boundary region 2' thereof.

In order to reproduce such a record a conventional magnetic reproducing head $H_2$ can be used as shown in FIG. 2. The output side of the magnetic head $H_2$ is connected to an amplifier A and the output thereof is led through a rectifier $R_2$ to a filter F which eliminates the carrier frequency to obtain the desired output as shown in FIG. 1–B. Thus the reproducing signal contains the low frequency signal component and the direct current signal component. Accordingly this invention has the advantage that an output of superior characteristics is obtained, as shown by a curve $M_2$ in FIG. 3 in which $f_0$ is the cutoff frequency of the filter F and $f_1$ is the carrier frequency.

If magnetic powder is put on the surface of the magnetic tape 1 having the above described superimposed recording and is applied, for example, by passing the magnetic tape through a suspension of carbonyl iron powder in alcohol, the wave form is displayed, as shown in FIG. 1–E due to the fact that the magnetic powder is attached or held on the lower side of the boundary region 2', this side being magnetized alternatively in the positive and negative strips. It will be appreciated that if the carrier frequency is very high, the pulse gap or strips below the boundary region 2' shown in FIG. 1–E become so narrow that the strips formed by the iron powder can not be seen by human eyes. In this condition, the magnetic tape part below the boundary region 2' is seen as if it were completely and homogeneously painted by magnetic powder, as is intended to be shown in FIG. 1–F. The magnetic tape thus treated displays the signal in a fashion which is analogous to that of a film on which a signal is optically recorded. Such a signal can not only be faithfully reproduced magnetically as hereinbefore described but also can be reproduced optically. That is, such a magnetic tape with such strips of iron powder thereon can be read out optically by use of a suitable photoelectric apparatus so that substantially the same reproducing effect as an optically recorded film can be expected from the magnetic tape when it is used in the talking movie art.

While I have explained a particular embodiment of my invention, it will be understood, of course, that I do not wish to be limited thereto since many modifications may be made and I, therefore, contemplate by the appended claims to cover any such modifications as fall within the spirit and scope of my invention.

What is claimed is:

1. A magnetic recording system of the boundary-displacement type comprising a magnetic recording medium, means for relatively moving said recording medium, means to record a signal along said relatively moving medium as a wave form boundary between regions of differently directed magnetization and means to magnetically record and superimpose bias pulses forming alternate areas of differently directed magnetization on said relatively moving medium and on only one side of its signal forming wave form boundary, said bias pulses being at a materially higher frequency than said signal.

2. The system of claim 1 wherein said means to magnetically record and superimpose is a second magnetic head arranged to subsequently record said alternate areas on only one side of said previously recorded signal forming wave form boundary.

3. A magnetic recording system of the boundary-displacement type comprising a magnetic tape, means to move said tape, a first, boundary-displacement type magnetic recording means to record a signal on said moving tape as a boundary-displacement type magnetic recording and a second magnetic recording means to subsequently record pulses of alternate areas of substantially oppositely directed magnetization on said moving tape, said second means including a magnetic recording head, an oscillator means to produce a carrier frequency current at a frequency which is materially higher than the frequency of said recorded signal and a half wave rectifier means connected between the output of said oscillator and said head.

4. A boundary-displacement type magnetic recording and reproducing system comprising a magnetic tape, means to move said tape, a first boundary-displacement type magnetic recording means to record a signal on said moving tape as a boundary-displacement type magnetic recording, a second magnetic recording means to subsequently record pulses forming alternate differently directed regions of magnetization on said moving tape, said second means including a magnetic recording head, an oscillator means to produce a carrier frequency current at a frequency which is materially higher than the frequency of said recorded signal and a half-wave rectifier means connected between the output of said oscillator means and said head, and a magnetic reproducing means comprising a magnetic reproducing head, an amplifier connected to the output of said reproducing head, a rectifier means connected to the output of said amplifier and a wave filter means for eliminating said carrier frequency current connected to the output of said rectifier means.

5. A magnetic recording system of the boundary-displacement type comprising a magnetic tape, means to move said tape, a first boundary-displacement type magnetic recording means to record a signal on said moving tape as a boundary-displacement recording, a second magnetic recording means to subsequently record pulses forming alternate differently directed regions of magnetization on said moving tape, said second means including a magnetic recording head, an oscillator means to produce a carrier frequency current at a frequency which is materially higher than the frequency of said recorded signal and a half wave rectifier means connected between the output of said oscillator means and said head and means to apply a magnetic powder to said tape after the recording of said carrier frequency thereon, said second recording means supplying its carrier frequency magnetization to said tape in such a direction as to be recorded on only one side of said signal wave by reversals of the saturate magnetization on said one side and said second recording means supplying its carrier frequency magnetization at a high enough frequency so that said magnetic powder visually appears as a continuous layer on said one side of said signal wave.

6. A magnetic recording medium, a signal modulated wave form having an advancing direction and recorded on said medium as a boundary between regions of oppositely directed magnetization, alternate strips on only one side of said wave form and extending substantially perpendicularly to its said advancing direction and recorded on said medium as oppositely directed regions of residual magnetism, and a magnetic powder on said strips.

7. An elongated magnetic recording tape having a width, a signal modulated wave form recorded on said tape and across its width as a boundary between regions of oppositely directed saturate magnetization, alternate strips extending substantially perpendicularly to the length of said elongated tape only on one side of said wave form to enhance its detectability and recorded on said tape as oppositely directed strip widths of saturate magnetization and magnetic powder held on the boundaries between said strips only on said one side of said wave form, said strip widths being so narrow that said magnetic powder appears visually as a substantially continuous layer.

8. The method of magnetic recording on a magnetic recording medium comprising relatively moving said medium and recording means, first magnetically recording a signal by the boundary-displacement method as a wave form between regions of oppositely directed magnetization along said direction of relative motion on said relatively moving medium and secondly and thereafter magnetically recording bias pulses of magnetization along said direction of relative motion on said relatively moving medium at a bias pulse frequency which is materially higher than said signal frequency and with said pulses of magnetization being in a direction to substantially correspond to one of said regions of oppositely directed magnetization to form alternate and differently magnetized strips transverse to and along said direction of relative motion and generally on and adjacent one side of said signal forming wave form boundary to enhance its detectability.

9. The method of claim 8 which also includes the applying of magnetic powder to be held on said previously recorded bias pulse strips on said medium at least along said signal forming wave form boundary.

10. A boundary-displacement type recording apparatus comprising a recording medium having a surface, means for relatively moving said medium, recording means to record a signal as a wave form boundary between regions of substantially oppositely directed substantial saturation across said surface and to at least simultaneously modify said recorded wave form by recording bias pulses at a materially higher frequency than said signal to not interfere with the detectability thereof and of an amplitude and direction to substantially reverse the saturation in alternate transverse narrow strips generally in only one said region and substantially on and adjacent one side of said wave form boundary to enhance its detectability.

11. The apparatus of claim 10 which also includes means to apply a powder to said surface of said medium to be held thereon only between said alternating, reverse saturation strips at least along said signal forming wave form boundary substantially on one side thereof.

12. The method of recording a boundary-displacement wave form and enhancing its detectability comprising relatively moving a recording means and a recording medium having a surface, applying substantially oppositely directed adjacent and substantially saturating recording forces to and along said surface and relatively signal modulating said forces to record a signal modulated wave form boundary between and defined by two regions of oppositely directed saturation and at least simultaneously modifying said recorded wave form by applying to and along said surface, at a frequency which is materially higher than said signal modulation to not interfere with the detectability thereof, alternating similar saturating recording forces of an amplitude and direction to substantially and alternately reverse one of the directions of signal modulated saturation to define boundaries between transverse strips in generally only one said region and substantially on and adjacent one side of said signal forming, wave form boundary to enhance its detectability.

13. The method of claim 12 which also includes the subsequent applying of a powder to said surface to be held thereon by and between said oppositely saturated and transverse strips at least along said signal forming wave form boundary.

14. As an article of manufacture, a boundary-displacement type record having the enhanced detectability and comprising a recording medium having a surface, a signal modulated wave form boundary having an advance direction across said surface between and defined by two regions of substantially oppositely directed substantially saturate recording and adjacent strips of alternately substantially reverse saturation defining boundaries therebetween, said strips being transverse to said advance direction, on substantially one side of, and at least adjacent to, said signal forming wave form boundary substantially in one of said regions, said strips having narrow widths which are only a small fractional part of a signal wave modulation so that said strips do not interfere with the detection of said signal modulations.

15. The article of claim 14 which also includes an optically detectable powder held on said surface by and between said oppositely saturated strips at least along said signal wave form boundary.

References Cited in the file of this patent

UNITED STATES PATENTS

| | | |
|---|---|---|
| 1,886,616 | Alverson | Nov. 8, 1932 |
| 2,632,061 | Begun | Mar. 17, 1953 |
| 2,632,815 | Crespinel | Mar. 24, 1953 |
| 2,743,320 | Daniels et al. | Apr. 24, 1956 |
| 2,816,175 | Blaney | Dec. 10, 1957 |
| 2,995,632 | Daniels | Aug. 8, 1961 |
| 3,013,124 | Epstein | Dec. 12, 1961 |

FOREIGN PATENTS

| | | |
|---|---|---|
| 1,026,974 | Germany | Mar. 27, 1958 |